United States Patent Office 2,733,255
Patented Jan. 31, 1956

2,733,255
SULFATED TELOMERS

Richard V. Lindsey, Jr., Wilmington, Del., assignor to E. I. du Pont de Nemours and Company, Wilmington, Del., a corporation of Delaware No Drawing. Application February 15, 1952, Serial No. 271,861

9 Claims. (Cl. 260—458)

This invention relates to new compositions of matter and to methods for preparing the same.

U. S. Patent 2,402,137 discloses that, when a polymerizable ethylenically unsaturated compound is reacted with a saturated organic compound containing only carbon, hydrogen, and oxygen, in the presence of a catalytic amount of a material which yields free radicals under the conditions of reaction, there are obtained products known as telomers which conform to the general formula $Y(A)_nZ$ in which A is a divalent radical derived from the ethylenically unsaturated compound, $n$ is an integer greater than one, and Y and Z are fragments from the saturated compound containing carbon, hydrogen, and oxygen.

This invention has as an object the preparation of new surface active agents. A further object is the preparation of new intermediates. Other objects will appear hereinafter.

These objects are accomplished by the present invention of sulfates of telomers of polymerizable monoolefin hydrocarbons with allyl or methallyl alcohol, i. e., an alcohol of the formula

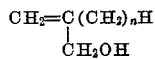

wherein $n$ is a cardinal number not greater than one. Of particular importance are the water soluble salts of the sulfates of said telomers, i. e., of the mixtures of products having in their compositions the components of one molecule of the

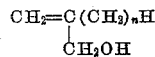

alcohol and the components of a plurality of molecules of the polymerizable monoolefin hydrocarbon.

The telomers from which the sulfates and water-soluble salts of this invention are obtained are prepared by charging a pressure reactor with a catalyst which is capable of yielding free radicals under the conditions of reaction and either allyl or methallyl alcohol. The charging operation is carried out under nitrogen or other inert atmosphere. The vessel is closed, evacuated to remove residual air, and placed in a shaker machine provided with a heater and means for adding monoolefin hydrocarbon to the vessel. A recording thermocouple is placed in position, the vessel is pressured with monoolefin hydrocarbon, and heating and agitation are started. On reaching the selected reaction temperature, the reaction starts and is followed by a pressure drop, due to the utilization of the monoolefin hydrocarbon. The pressure is maintained in the range selected for reaction by addition of fresh monoolefin hydrocarbon, as required. The end-point of the reaction is taken to be when pressure ceases to drop. The vessel is then allowed to cool, opened, and the contents discharged. The product is isolated by methods shown in the examples, or by simple modifications of such methods which are readily apparent to those skilled in the art.

The sulfates are prepared by treating the above telomers with a sulfating agent such as sulfuric acid, sulfur trioxide, or chlorosulfonic acid, and the salts by neutralizing the sulfates with the required amount of alkali.

In actual practice, it is best to effect the sulfation in the presence of an inert organic solvent in order to moderate the reaction and suitable solvents are diethyl ether, $\beta,\beta'$-dichlorodiethyl ether, carbon tetrachloride, trichloroethylene, n-hexane, etc. The sulfation is generally carried out at temperatures of —10 to +50° C., but lower and higher temperatures may be used, if desired. This, however, has no practical advantage, and the use of temperatures outside the specified range is not recommended.

When the sulfation is carried out with chlorosulfonic acid, it is desirable to include an acid acceptor in the reaction mixture, and a particularly useful one is pyridine.

In practice it is convenient and practical to convert the sulfates to water-soluble salts by simply adding the required amount of alkali to the crude sulfate mixture.

The following examples in which parts are by weight are illustrative of the invention.

Example 1

A mixture of 50 g. of allyl alcohol and one g. of hydrazine was charged into a 150 cc. shaker tube. After evacuation, ethylene was admitted until the pressure reached 200 atmospheres at room temperature and the mixture heated from 250 to 300° C., the heating rate being regulated by the pressure drop. After 1.5 hours, the pressure drop amounted to 300 atmospheres. The reaction mixture was cooled and discharged from the reactor. Distillation yielded 22 g. of allyl alcohol containing traces of propionaldehyde, 11 g. boiling at 133–220° C. and 20 g. boiling at 60–260° C. at 2 mm. Higher boiling, waxy telomers amounted to 7.4 g. Analysis of the 60–250° C./2 mm. fraction showed it to contain 6.91% hydroxyl, indicating an average molecular weight of 246.

The allyl alcohol/ethylene telomer boiling at 60–250° C./2 mm. obtained as above was sulfated by addition of 14 g. of chlorosulfonic acid to the 20 g. of telomer dissolved in a mixture of 200 cc. of absolute ether and 20 cc. of pyridine. After all of the chlorosulfonic acid had been added, the reaction mixture was refluxed for two hours and allowed to stand overnight. The ether was decanted from a thick gum and distillation showed it to contain very little nonvolatile material. The nonvolatile material and the gummy product were poured on ice and the resulting mixture neutralized with excess potassium bicarbonate. Water-insoluble material was removed by extraction with petroleum ether. The aqueous solution was evaporated to dryness on a steam bath, and the potassium alkyl sulfates extracted with hot 2B denatured alcohol. After evaporation of the alcohol there remained 18 g. of a thick, dark paste. Surface tension measurements on solutions of this material in distilled water gave the following results.

| Concentration, percent: | Surface tension, dynes/cm. |
|---|---|
| 1.0 | 34 |
| 0.5 | 40 |
| 0.1 | 55 |
| 0.01 | 75 |

The telomers of this invention are moderately low in average molecular weight and are normally liquid. Ethylene/methanol telomers are principally high molecular weight and are solids. Alkali metal salts of sulfates of the liquid telomers of this invention are highly water-soluble and are surface-active in aqueous solutions while similar salts of sulfates of ethylene/methanol telomers are water-insoluble and non-surface active.

A distillation cut boiling at 50–300° C. at 2 mm. can also be sulfated by the same procedure.

Example II

Allyl alcohol, 40 g., hydrazine, 1 g., and propylene, 2800 atmospheres, were reacted at 289–294° C. for four hours. During this time, the pressure drop totaled 1200 atmospheres. Distillation yielded 21 g. of crude allyl alcohol and 25 g. of telomer distilling between 80° C./40 mm. and 225° C./1 mm. The higher boiling residue amounted to 9 g. The 80° C./40 mm.–225° C./1 mm. fraction was sulfated as above to yield a surface-active material.

The preferred sulfates, from the standpoint of surface activity, are those obtained from telomers containing from 3–10 units of olefin per allyl or methallyl alcohol unit and especially useful from this standpoint are those containing from 10–20 carbon atoms.

The present invention is generic to sulfates of telomers of either allyl or methallyl alcohol with a polymerizable monoolefin hydrocarbon, especially those containing from two to four carbon atoms and in which the ethylenic double bond is the sole carbon-carbon unsaturation, including ethylene, propylene, and the butylenes.

With monoolefin hydrocarbons which are normally gases such as ethylene, it is not convenient or feasible to weigh accurately the amount charged into the reaction vessel. With these hydrocarbons, it is more practical to express the charge as the ratio of the volume of gas under the temperature and pressure conditions of the reaction to the weight of the allyl or methallyl alcohol charged. To illustrate, in a 400 cc. reactor if the amount of allyl or methallyl alcohol is 50 to 200 g., then the remainder of the space, that is, 350 to 200 cc. is occupied by the hydrocarbons under the temperature and pressure conditions selected for the reaction. Generally, the weight of allyl or methallyl alcohol employed will be between one-half and twice the volume of gas.

The reaction between the monoolefin hydrocarbon and the allyl or methallyl alcohol will not take place in the absence of a catalyst. Effective catalysts are compounds which produce free radicals under the conditions of reaction. The preferred catalysts are hydrazine and hydrazinium compounds disclosed in U. S. Patent 2,405,950. Examples are hydrazine, and the alkyl, benzene sulfonyl, acyl (both aliphatic and aromatic) substitution products thereof, such as the mono- and dimethyl hydrazine, benzyl hydrazine, acetyl hydrazine, etc., because the best yields of desired products are obtained with these materials. In place of these, however, there can be used amine oxides, organic peroxy compounds, azo compounds.

The amount of catalyst is generally between 1% and 10% by weight of the allyl or methallyl alcohol. There is nothing critical about the upper limit and larger amounts of catalyst can be employed but have no advantage either from the standpoint of better yields of desired product or improving the rate of reaction and may be disadvantageous in decreasing the molecular weight and introducing contaminating telomers not containing allyl or methallyl alcohol residues.

The reaction between the monoolefin hydrocarbon and the allyl or methallyl alcohol has a high temperature coefficient and it is therefore necessary to carry it out at temperatures which are at least 200° C. and preferably above 250° C. Employment of temperatures substantially in excess of 350° C. is not generally required, and this therefore represents a practical upper limit.

It is critical that pressures which are at least 500 atmospheres be employed. For practical reasons, pressures above 3000 atmospheres are not used. Most generally, the best results from the standpoint of yield and molecular weight distribution of the products are obtained in the more restricted range of 700–1500 atmospheres, and this embraces the preferred operating pressure conditions.

Although it is not necessary to employ a reaction medium, since the allyl and methallyl alcohols can function both as reactants and as reaction media, if desired, an inert reaction medium can be used to regulate or moderate the reaction. Suitable media are isooctane, n-hexane, etc. The amount of reaction medium can range from 5 to 70% by weigth of the allyl or methallyl alcohol. When a reaction medium is used, it is advantageous for economic reasons to keep the amount as low as possible.

The allyl and methallyl alcohols are used in as pure form as possible because the telomerization reaction is highly sensitive to impurities.

In the sulfation, it is desirable to employ at least one equivalent of the sulfating agent per hydroxyl group in the telomer, as determined by hydroxyl number. Larger amounts of the order of 1.5 to 2 equivalents are usually employed because of the better yields and improved reaction rates obtained thereby.

In the preparation of the water-soluble salts there may be used any alkali metal hydroxide, oxide, or carbonate, such as, sodium or potassium hydroxides, oxides, or carbonate. In place of these and as equivalents thereof there may be used ammonium hydroxide, ammonia, ammonium carbonate or other nitrogen compound capable of forming salts with acids.

In the examples the alkali metal sulfate, formed in the neutralization step, has been removed by extraction. This is not necessary, however, and in actual practice it is convenient and practical to leave it in the neutralized mixture since it functions as a builder for the surface-active composition.

The sulfated telomers in the form of their water-soluble salts have surface-active properties, and are useful as textile assistants. Representative uses for the sulfates and their salts include, in addition to the previously mentioned application as textile assistants, their employment alone or with other suitable detergents for cleansing and scouring animal and vegetable fibers, to remove fatty or oily materials, as penetrants and saturating agents to aid in obtaining level dyeing, etc.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A sulfated telomer of ethylene and allyl alcohol.
2. A sulfated telomer of ethylene and an alcohol of the formula

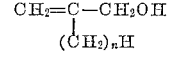

wherein $n$ is a cardinal number not greater than one.

3. A sulfated telomer of a polymerizable monoolefinic monounsaturated hydrocarbon of two to four carbons with an alcohol of the formula

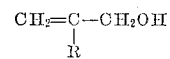

wherein R is a member of the class consisting of hydrogen and methyl.

4. A sulfated telomer of a polymerizable monoolefinic hydrocarbon wherein the ethylene linkage is the only aliphatic unsaturation with an alcohol of the formula

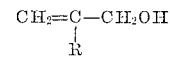

wherein R is a member of the class consisting of hydrogen and methyl.

5. A process for the preparation of surface active agents wherein ethylene and allyl alcohol are reacted, at a temperature of at least 200° C. and a pressure of at least 500 atmospheres, in the presence of a free radical producing catalyst and the reaction product containing in its composition the components of a plurality of moles of ethylene and the components of one mole of the alcohol is reacted with a sulfating agent.

6. A process for the preparation of surface active agents wherein ethylene and an alcohol,

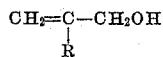

wherein R is a member of the class consisting of hydrogen and methyl are reacted, at a temperature of at least 200° C. and a pressure of at least 500 atmospheres, in the presence of a free radical producing catalyst and the reaction product containing in its composition the components of a plurality of moles of ethylene and the components of one mole of the alcohol is reacted with a sulfating agent.

7. A process for the preparation of surface active agents wherein a polymerizable monoolefinic monounsaturated hydrocarbon of two to four carbons and an alcohol,

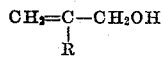

wherein R is a member of the class consisting of hydrogen and methyl are reacted, at a temperature of at least 200° C. and a pressure of at least 500 atmospheres, in the presence of a free radical producing catalyst and the reaction product containing in its composition the components of a plurality of moles of said hydrocarbon and the components of one mole of the alcohol is reacted with a sulfating agent.

8. A process for the preparation of surface active agents wherein a polymerizable monoolefinic monounsaturated hydrocarbon of two to four carbons and an alcohol,

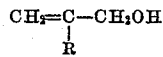

wherein R is a member of the class consisting of hydrogen and methyl, are reacted, at a temperature of at least 200° C. and a pressure of at least 500 atmospheres, in the presence of a free radical producting catalyst, fractionally distilling the reaction product and reacting, with a sulfating agent, a distillation fraction thereof containing in its composition the components of a plurality of moles of the monoolefinic hydrocarbon and the components of one mole of the alcohol.

9. A process for the preparation of surface active agents wherein a polymerizable monoolefinic monounsaturated hydrocarbon of two to four carbons and an alcohol,

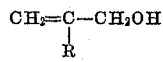

wherein R is a member of the class consisting of hydrogen and methyl, are reacted, at a temperature of at least 200° C. and a pressure of at least 500 atmospheres, in the presence of a free radical producing catalyst, fractionally distilling the reaction product and reacting the portion boiling at 50–300° C. at 2 mm. with a sulfating agent.

References Cited in the file of this patent

UNITED STATES PATENTS

| | | |
|---|---|---|
| 2,308,192 | Mikeska et al. | Jan. 12, 1943 |
| 2,387,755 | Hanford | Oct. 30, 1945 |
| 2,402,137 | Hanford et al. | June 18, 1946 |
| 2,438,021 | Roland | Mar. 16, 1948 |
| 2,511,911 | Fuchs et al. | June 20, 1950 |
| 2,583,426 | Hillyer et al. | Jan. 22, 1952 |
| 2,595,341 | Dinerstein et al. | May 6, 1952 |